United States Patent [19]

Das et al.

[11] Patent Number: 4,970,276

[45] Date of Patent: * Nov. 13, 1990

[54] PHENOLIC TRIAZINE COPOLYMERS BASED ON PURE CYANATO NOVOLACS

[75] Inventors: Sajal Das, Parsippany; Dusan C. Prevorsek, Morristown, both of N.J.

[73] Assignee: Allied-Signal Inc., Morris Township, Morris County, N.J.

[ * ] Notice: The portion of the term of this patent subsequent to May 16, 2006 has been disclaimed.

[21] Appl. No.: 357,637

[22] Filed: May 26, 1989

Related U.S. Application Data

[63] Continuation of Ser. No. 41,018, filed as PCT US87/00123 on Jan. 16, 1987, abandoned, which is a continuation-in-part of Ser. No. 821,658, Jan. 23, 1986, abandoned.

[51] Int. Cl.$^5$ .................... C08G 8/28; C08L 61/06
[52] U.S. Cl. .................... 525/504; 525/480; 528/142; 528/146; 528/162
[58] Field of Search ............. 525/504, 480; 528/142, 528/146, 162

[56] References Cited

U.S. PATENT DOCUMENTS

| | | |
|---|---|---|
| 3,444,137 | 5/1969 | Higginbottom et al. |
| 3,448,079 | 6/1969 | Grigat et al. |
| 3,890,272 | 6/1975 | D'Alelio |
| 3,929,713 | 12/1975 | D'Alelio |
| 3,966,670 | 6/1976 | Grazen et al. |
| 4,022,755 | 5/1977 | Tanigaichi et al. |
| 4,096,108 | 6/1978 | Webb et al. |
| 4,118,377 | 10/1978 | D'Alelio |
| 4,157,360 | 5/1979 | Prevorsek et al. |
| 4,218,361 | 8/1980 | Searjean et al. |
| 4,219,452 | 8/1980 | Littlefield |
| 4,268,657 | 5/1981 | Manzara ................... 528/155 |
| 4,281,361 | 7/1981 | Patz et al. |
| 4,477,629 | 10/1984 | Hefner, Jr. |
| 4,487,915 | 2/1984 | Hefner, Jr. |
| 4,489,202 | 12/1984 | Hefner, Jr. |
| 4,515,934 | 5/1985 | Hefner, Jr. |
| 4,528,366 | 7/1985 | Woo et al. |

FOREIGN PATENT DOCUMENTS

| | | |
|---|---|---|
| 0147548 | 7/1985 | European Pat. Off. |
| 1720740 | 9/1971 | Fed. Rep. of Germany |
| 58-34822 | 3/1983 | Japan |
| 149918 | 8/1984 | Japan |
| 59-149918 | 8/1984 | Japan |
| 85/03713 | 8/1985 | World Int. Prop. O. |

OTHER PUBLICATIONS

Kunstoffe, Bd, 58, pp. 827–832, (1968), by R. Kubens et al.

Dokl, and Akad, Nauk SSSR., vol. 202, pp. 347–350, (1972), by V. V. Kovhak et al.

Co-pending U.S. Ser. No. 104,700, filed Oct. 5, 1987, Sajal Das et al., "Cyanato Group Containing Phenolic Resin Phenolic Triazines Derived Therefrom".

Copy of recently filed application for Cyanato Group Containing Phenolic Resins, Phenolic Triazine Triazine Resins Derived Therefrom by Sajal Das and Dusan Prevorsek, filed Oct. 5, 1987, Declaration for Patent Application an Power of Attorney.

*Primary Examiner*—John Kight, III
*Assistant Examiner*—Frederick Krass
*Attorney, Agent, or Firm*—Richard C. Stewart; Gerhard H. Fuchs; Ernest D. Buff

[57] ABSTRACT

Phenolic cyanate/phenolic triazine copolymers and cured resins prepared therefrom.

60 Claims, No Drawings

PHENOLIC TRIAZINE COPOLYMERS BASED ON PURE CYANATO NOVOLACS

RELATED APPLICATION

This application is a continuation of application Ser. No. 041,018, filed as PCT US87/00123 on Jan. 16, 1987, now abandoned, which is a continuation-in-part of Ser. No. 821,658 filed on Jan. 23, 1986.

BACKGROUND OF THE INVENTION

1. Field of the Invention

This invention relates to certain novel phenolic cyanate-phenolic triazine copolymers, and to a process of preparing same. More particularly, this invention relates to such copolymers which have improved properties and to a process for preparing such resins.

2. Prior Art

Phenolic resins are a class of synthetic materials that have grown continuously in terms of volume and applications for over several decades. The building blocks used in greatest volume are phenol and formaldehyde. Other important phenolic starting materials are the alkyl-substituted phenols, including cresols, xylenols, p-tert-butyl-phenol, p-phenylphenol, and nonylphenol. Diphenosl, e.g., resorcinol (1,3-benzenediol) and bisphenol-A [bis-A or 2,2-bis(4-hydroxylphenyl)propanel], are employed in smaller quantities for applications requiring special properties. In addition to formaldehyde, acetaldehyde or furfuraldehyde sometimes are employed but in much smaller quantities. The greater latitude in molecular structure, which is provided by varying the raw materials, chemistry, and manufacturing process, has made possible an extremely large number of applications for these products as a result of the array of physical properties that arise from the synthetic options.

The early investigation of the reaction of phenol and formaldehyde began with the work of von Baeyer and others in the early 1870's as an extension of phenolbased dye chemistry. The initial experiments result in soluble, amorphous products whose properties elicited little interest. Insoluble, cross-linked products also were reported in the lates 1880's, but these products also were not perceived as useful materials. In 1888, the first patent for a phenolic-resin product intended for use as a hard-rubber substitute was granted. The first commercial product was introduced as a shellac substitute by the Louis Bluner Company in the early 1900's. Process patents were issued in 1894 and 1895 for ortho- and para-methylolphenol, respectively.

Key innovations in early phenolic-resin manufacture included control of the molecular structure and the ue of heat and pressure to achieve desirable physical properties in filled compositions. Studies in the use of acidic or basic catalysts and of changes in the molar ratio of formaldehyde to phenol resulted in the definition of two classes of polymeric materials which are referred to as Bakelite resins. Caustic-catalyzed products, which are prepared with greater than a 1:1 mol ratio of formaldehyde to phenol, can be used to form cross-linked, insoluble, and infusible compositions in a controlled fashion. With less than a 1:1 mol ratio of formaldehyde to phenol, the resultant products remain soluble; furthermore, acid catalysis yields permanently stable compositions, whereas base-catalyzed materials can be advanced in molecular weight and viscosity. Possibly of greatest importance to early commercialization, howeve, was the reduction to practice of the use of heat and pressure to produce essentially void-free molding compositions.

Resole resins are made with an alkaline catalyst and a molar excess of formaldehyde. Novolak or novolac resins are prepared with an acid catalyst and less than one mol of formaldehyde per mol of phenol. The initial reaction involved in the preparation of resolated novolacs is carried out with an acid catalyst and less than a 1:1 mol ratio of formaldehyde to phenol. After formation of the novolac, the pH is adjusted so that the reaction mixture is basic and additional formaldehyde is added. Resoles and resolated novolaks are inherently thermosetting and require no curing agent for advancement. Novolacs, by comparison, are themoplastic and require the addition of a curing agent, the most common being either hexamethylene-tetramine or a resole. The stages of molecular weight advancement are characterized by liquid or solid phenolic polymer which is soluble in certain organic solvents and is fusible; solid resin which is insoluble but swelled by organic solvents and, although softened by heat, exhibits essentially no flow; and an insoluble, infusible product which is not swelled by solvents nor softened by heat, i.e., the system is in a highly cross-linked state.

Phenolic resins have many uses. For example, such materials are used as bonding agents in friction materials such as brake linings, clutch facings, transmission bonds and the like. For example, U.S. Pat. Nos. 4,268,157; 4,069,108; 4,268,657; 4,218,361; 4,219,452; and 3,966,670 describe various friction materials in which a phenolic resin is employed as the bonding agent. Phenolics are also used as molding materials, and as coatings and adhesives. Phenolic resins developed for non-flammability and long-term temperature stability to 230° C. have been studied in carbon-fiber composites. Potential for such composites lies in advanced aricraft application.

While present day phenolics exhibit several beneficial properties, they suffer from a number of disadvantages which restrict their utility. For example, such materials exhibit less than desirable thermal oxidative stability. Other major problems of present day phenolic technology include a need for auxilary chemicals such as hexamethylenetetraamine to crosslink the phenolic which often results in the production of volatile by-products such as ammonia during crosslinking is often extensive and is not controllable.

Various modifications to phenolics have been proposed to obviate certain of the disadvantages attendant to these resins. For example, epichlorohydrin has been reacted with the hydroxyl groups of novolak forming epoxy novolak. Moreover, n-chloro-2-propene has been reacted with the hydroxyl groups of novolac to form the corresponding form methylon resin. Similarly, Japanese Patent Publications Nos. 59-149918, and 58-34822 describe a method of preparing a phenolic resin containing cyanate groups. In this method, a trialkyl ammonium salt of a phenol novolak is reacted with excess cyano halogen in an organic solvent such as methylene chloride. The ammonium by-product salt is separated from the reaction mixture by extraction with water. Several disadvantages are attendant to the process of these references. For example, only low molecular weight novolacs (MW~325 or less) are partially soluble in the reaction solvent which reacts in low reaction yield (60 to 70%). When higher molecular weight novolacs are used (MW~500), yields are low (<40%).

U.S. Pat. No. 3,448,079 describes aromatic cyanic acid esters produced by the reaction of phenolic resins with cyanogen halide in which the hydroxyl groups of the phenol-formaldehyde resins are replaced with cyanic acid ester groups, and process for producing same. U.S. Pat. No. 3,444,137 describes curable phenol-aldehyde resins characterized by molecules which contain a cyano group, an amine nitrogen atom, a phenyl group and a substituted hydroxyl group, such molecules having been made by reacting a phenol, formaldehyde and a cyano substituted primary or secondary amine. U.S. Pat. No. 4,022,755 describes cyanato-group containing phenol resins, and a process for preparing same.

Various new polymers have been proposed. For example, Kunstoffe, Bd, 58, pp. 827-832 (1968) by R. Kubens, et al. and Dokl, and Akad, Nauk SSR Vol. 202, pp. 347-350 (1972) by V. V. Kovshak, et al. describe the "cyclotrimerization" of aryl cyanurate and properties of crosslinked polymers derived therefrom. By the term "cyclotrimerization" is meant forming a cyanurate ring system by chain extension polymerization of three aromatic cyanurate groups to form a crosslinked triazine ring system.

U.S. Pat. No. 4,157,360 describes thermoformable compositions comprising a crosslinked polycyanurate polymer and a thermoplastic polymer in which the polycyanurate is formed by a polycyclotrimerization reaction.

SUMMARY OF THE INVENTION

The present invention is directed to a phenolic cyanate/phenolic triazine copolymer comprising three or more phenolic moieties of the Formula I.

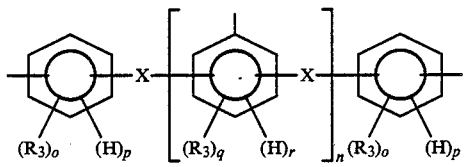

Formula I linked by way of at least one of said open valencies to one or more triazine moieties of the Formula II:

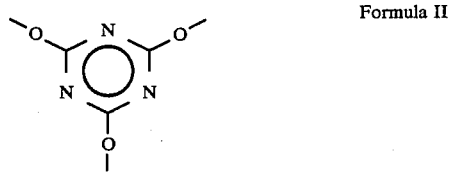

Formula II and wherein the remainder of the open valencies of said phenolic moieties are substituted with —OH, —OCN, or other triazine moieties, provided that at least one of said remaining open valencies is substituted with a —OCN moiety; wherein:

n is a positive whole number greater than or equal to 1;

q and r are the same or different at each occurrence and are whole numbers from 0 to 3, with the proviso that the sum of q and r at each occurrence is equal to 3;

o and p are the same or different at each occurrence and are whole numbers from 0 to 4 with the proviso that the sum of o and p at each occurrence is equal to 4;

—X— is a divalent organic radical; and $R_3$ is the same or different at each occurrence and is a substituent other than hydrogen which is unreactive under conditions necessary to completely cure the copolymer.

Another aspect of this invention relates to compositions containing the phenolic cyanate/phenolic triazine copolymer of this invention, and to partially cured, completely cured and incompletely cured compositions formed by "cyclotrimerization" of the cyano groups of said copolymer to varying degrees. As used herein, "completely cured" phenolic cyanate/phenol triazine copolymer are those in which less than about 20 mol percent of the original cyano groups remain unreacted, i.e. uncyclotrimerized, as determined by the method of infrared spectrophotometry; "partially cured" phenolic triazine/phenolic cyanate copolymer are those in which from about 40 to about 70 mol percent of the original cyano groups are unreacted, i.e. uncyclotrimerized, as determined by infrared spectrophotometry; and "incompletely cured" phenolic triazine/phenolic cyanate copolymer are those in which from about 40 to about 20 mole percent of the original cyano groups are unreacted, i.e. uncyclotrimerized, as determined by infrared spectrophotometry.

Still, another aspect of this invention relates to compositions comprising the phenolic cyanate/phenolic triazine of this invention, or partially cured, incompletely cured and completely cured embodiments thereof in admixture with one or more other materials as for example, thermoset and thermoplastic polymers such as kevlar and polyethylene, particulate and fibrous inorganic fillers, as for example, asbestos, mica, boron, carbon and the like.

The cured resin derived from the phenolic cyanate/phenolic triazine copolymer of this invention exhibit several advantages over conventional phenolic resins. For example, these materials are soluble in one or more aprotic solvents and are also fusible or meltable which greatly enhances their process ability. In addition, these materials are self crosslinking, and thus do not require auxilliary chemicals for crosslinking and have longer shelf lives as compared to conventional phenolics and modified phenolics. Moreover, the crosslinked, i.e. cured, resins of this invention have greater oxidative, mechanical and thermal stability as compared to conventional phenolic resins, and non volatile, potentially environmentally hazardous by-products are not produced during crosslinking. Furthermore, the phenolic cyanate/phenolic triazine resins of this invention have higher char forming properties, better elongation properties and higher glass transition temperatures than the conventional phenolic resins.

DESCRIPTION OF THE PREFERRED EMBODIMENTS

One aspect of this invention relates to phenolic triazine/phenolic cyanate copolymers having at least three phenolic moieties of the Formula I linked by at least one of said open valencies to one or more triazine moieties of the Formula II. The remainder of said open valencies being substituted with —OCN, —OH or other triazine moieties, provided that at least one of said remaining open valencies is substituted with a —OCN group, wherein $R_3$, n, q, r, o, and X are as described above.

In the structure of Formula I, $R_3$ is an inert substituent. Illustrative of suitable $R_3$ grous are such inert substituents as halogen, trihalomethyl, alkyl, alkoxy, phenyl and the like.

In the structure of Formula I, —X— is a divalent organic radical. Illustrative of suitable —X— groups are alkylene such as methylene, ethylmethylene, 2-ethylpentylmethylene, methylmethylene, isopropylmethylene, isobutylmethylene, pentylmethylene, furylmethylene, and the like; arylenes such as 1,3-benzenedimethylene, phenylmethylene, 1,4-benzenedimethylene, 2,2-bis-(4-phenylene)propane, 4-methoxyphenylmethylene, bis-(4-phenylene)methane, 4,4-diphenylene dimethylethane and the like; and cycloalkylenes such as cyclohexylene, cyclooctylene, 1,3-cyclohexanedimethylene, and the like.

In the preferred embodiments of the invention;

—X— is substituted or unsubstituted methylene or 1,4-phenyldimethylene wherein permissible substituents are alky or furyl;

q and r are the same or different at each occurrence and are positive whole numbers from 0 to 3, with the proviso that the sum of 0 and r is 3;

$R_3$ is alkyl;

n is from 1 to about 20; and o and p are the same or different at each occurrence and are positive whole numbers from 0 to 4, with the proviso that the sum of o and p is 4;

Wherein up to about 30 mole % of the phenyl moieties of said copolymer are substituted with said triazine moieties, up to about 90 mole % of said phenyl moieties are substituted with —OH groups and up to about 90 mole % of said phenyl moieties are substituted with —OCN groups, said mole % based on the total moles of phenyl groups in said copolymer.

Amongst the preferred embodiments of the invention, particularly preferred are those embodiments of the invention in which:

from about 2 to about 25 mole % of said phenyl groups of the phenolic triazine/phenolic cyanate copolymer are substituted with triazine moieties, from about 40 to about 90 mole % of said phenyl groups are substituted with —OCN groups and from about 2 to about 50 mole % of said phenyl groups are substituted with —OH groups, said mole % based on the total moles of phenyl group in said copolymer;

—X— is methylene, methylene substituted with alkyl having from about 1 to about 10 carbon atoms, halogen or furfuryl, or xylene;

$R_3$ is methyl or ethyl;

o is 0 or 1;

n is from about 1 to about 10;

q is 0 or 1;

r is 1 to 3; and p is 1 to 4.

Amongst these particularly preferred embodiments, most preferred are those embodiments wherein:

n is 3 to about 10;

from about 5 to about 20 mole % of the phenyl groups of the phenyl triazine/phenyl cyanate copolymer are substituted with triazine moieties, from about 40 to about 80 mole % of said phenyl groups are substituted with —OCN groups and from about 5 to about 20 mole % of said phenyl groups are substituted with —OH groups; said mole % based on the total moles of phenyl groups in said copolymer;

q is 0;

o is 0;

X is a moiety of the formula: —CH$_2$—, —CF$_2$—,

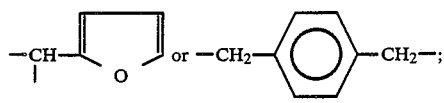

r is 3; and p is 4.

Especially good results are obtained in the practice of this invention where from about 10 to about 20 mole % of the phenyl groups in the phenolic triazine/phenolic cyanate copolymer are substituted with triazine moieties, from about 10 to about 20 mole % of said phenyl groups are substituted with —OH groups and from about 60 to about 80 mole % of said phenyl groups are substituted with —OCN groups, said mole % based on the total moles of phenyl groups in said copolymer.

These especially preferred copolymers are preferably linear copolymers having recurring units of the Formula III:

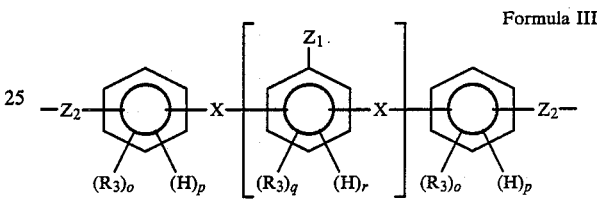

Formula III wherein $R_3$, o, p, q, r, —X— and n are as described above and wherein:

$Z_1$ is —OH and —OCN; and $Z_2$ is a trivalent triazine moiety;

With the proviso that from about 10 to about 20 mole % of the phenyl groups of the copolymer are substituted with trivalent triazine moieties, from about 70 to about 75 mole % of phenyl groups as substituted with —OCN groups and from about 10 to about 20 mole % of the phenyl groups are substituted with —OH groups, said mole % based on the total moles of phenyl groups in the copolymer.

A reinforced and/or filled composition comprising the completely cured, partially cured, and incompletely cured phenolic triazine/phenolic cyanate copolymer of this invention, as well as the compositions which may be used in the preparation of such reinforced compositions are also part of the invention disclosed herein. The completely cured, precured, partially cured, and incompletely cured compositions as described, may contain fillers for use in where the structural strength and integrity of a structure has to be maintained, and for other purposes known to those of skill in the art. Any suitable filler known to those of skill in the art can be used. Such fillers may be selected from a wide variety of organic and inorganic materials such as polymers, minerals, metals, metal oxides, siliceous materials and metal salts. Illustrative of useful fillers are fiber glass, steel, asbestos fibers, aramide, boron and carbon fibers, as well as plate like, fibrous and particulate forms of alumina, brass powder, aluminum hydrates, iron oxide, feldspar, lead oxides, asbestos, talc, barytes, calcium carbonates, clay, carbon black, quartz, novaculite and other forms of silica, koalinite, aluminum silicate bentonite, garnet, mica, saponite, beidelite, calcium oxide, fused silica, calcium hydroxide, eta. Other useful fillers include thermoplastic polymer, as for example, polyesters, polyimides, polyamides, polysulfones, polyaramids, polyester carbonates, polyethers, polyethersulfones, polyethylene, polypropylene, polycarbonates, polyetherimides, polysulfides, polyacrylates, polyvinyls and the like. The foregoing recited fillers are illustrative only and are not meant to limit the scope of the fillers that can be utilized in this invention. Methods for producing reinforced and/or filled compositions include melt blending, extrusion and molding processes, simple mixing and dispersion of both materials in suitable medium by methods known in the art.

The phenolic triazine/phenolic cyanate copolymer of this invention is prepared by controlled "polycyclotrimerization" of a modified phenolic resin of the Formula IV:

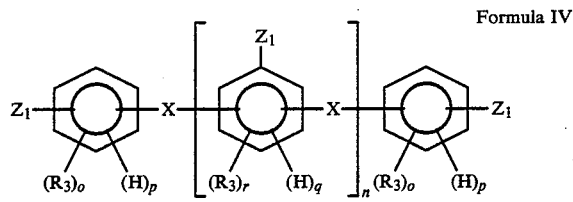

Formula IV to the extent necessary to form the desired mole precent of trivalent triazine moieties, where $R_3$, q, r, o, p, n, $Z_1$ and X are as described above, provided that the amount of $Z_1$ group which are —OCN is sufficient to provide the desired mole % of triazine moieties and —OCN moieties in the desired copolymer. By the term "polycylotrimerization" is meant forming a cyanurate ring system by the chain extension polymerization of three aromatic cyanate groups to form the crosslinked triazine ring system which comprises the following basic repeat unit of Formula II:

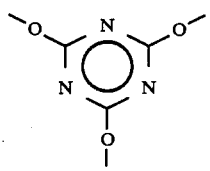

wherein the open valencies are bonded to a phenyl ring of a phenolic moiety. The methods of conducting the polycyclotrimerization of cyanurate compounds are well known in the art, and include thermal annealing above about 200° C. For example, such methods are described in Kunststoffe, Bd, 58, pp. 827-832 (1968) by R. Kubens, et al. and Pokl Ak ad Nauk SSR, Vol. 202, pp. 347-350 (1972) by V. V. Korshak, et al. and U.S. Pat. No. 4,157,360 which are hereby incorporated by reference. For example, an appropriate modified phenolic resin of the above Formula I can be crosslinked, preferably neat, with or without an acceptable catalyst at elevated temperatures.

The polymerization is induced thermally. The threshold polymerization temperature can vary widely depending on a number of factors, as for example, the presence or lack of a catalyst, the type of catalyst when used, the presence of free hydrogen groups and the like. In general, the threshold polymerization temperature is equal to or greater than about 25° C. In the preferred embodiments of the invention, the threshold polymerization temperature is from about 100° C. to about 350° C., and in the particularly preferred embodiments is from about 100° C. to about 300° C. Amongst these particularly preferred embodiments, most preferred are those embodiments in which the threshold polymerization temperature is from about 120° C. to about 250° C. Heating can be accomplished by conventional methods known to those skill in the art. Illustration of such methods are heating with an oil bath, vacuum, hot air annealing, compression molding and the like.

The polymerization is preferably carried out in the presence of a ctalytically effective amount of a catalyst. Useful catalyst can vary widely and include anhydrous metal salts such as stannous chloride dihydrate, cuprous bromide, cuprous cyanide, cuprous ferricyanide, zinc chloride, zinc bromide, zinc iodide, zinc cyanide, zinc ferrocyanide, zinc acetate, silver chloride, ferrous chloride, nickel chloride, ferric chloride, cobaltous cyanide, nickel sulfate, stannic chloride, nickel carbonate, and the like. Also useful as catalyst are proton-donating organic reducing agents such as tetrahydropyridine, hydroquinone, 4,4-biphenol and the like. Amounts of the catalyst when used are not critical and can vary widely provided that the amount is sufficient to catalyze the reaction to the desired extent.

Reaction pressures are not critical and can vary widely. The reaction can be carried out at subatmospheric, atmospheric or super-atmospheric pressure. However, for convenience, the reaction is carried out at autogenous pressure or atmospheric pressure.

During the esterification of the phenolic resin, we have discovered that in addition to formation of —OCN moieties, carbamate moieties may be formed by reaction of —OCN functions with active hydrogen containing materials such as $H_2O$ and $C_2H_5OH$ forming the carbamate functions —$C(O)NH_2$ or —$C(OH)=NH$, and —$C(OC_2H_3)=NH$ respectively. In addition, when amines are employed as the base catalyst in the preparation of the phenolic cyanate of Formula IV as will be described in more detail below, dicyanamides as for example, $(C_2H_5)_2$ NCN, may form in the phenolic cyanate and consequently will be a contaminant in the desired phenolic cyanate/phenolic triazine copolymer. We have also discovered that the mole % of carbamate functions substituted to phenyl groups of the phenolic cyanate precursor used in the preparation of the phenolic triazine/phenolic cyanate copolymer of this invention and/or the amount of dicyanamide formed during the preparation of the phenolic cyanate precursor are critical to the shelf life of the phenolic cyanate precursor and to the phenolic cyanate/phenolic triazine copolymer of this invention, and to the processibility of the copolymer. In general, the mole % of phenyl groups substituted with carbamate functions is equal to or less than about 20 mole % based on the total moles of phenyl groups present in the copolymer, and the weight percent of dicyanamide present in the copolymer is equal to or less than about 20 weight percent based on the total weight of the copolymer. In the preferred embodiments of the invention, the mole % of phenyl groups substituted with carbamate functions is equal to or less than about 10 mole % based on the total moles of phenyl groups, and the weight percent of dicyanamide present in the copolymer is equal to or less than about 5 weight percent based on the total weight of the copolymer. In the particularly preferred embodiments of the invention, the mole % of phenyl groups substituted with carbamate functions is equal to or less than about 5 mole % preferably less than 2 mole % and more preferably less than 1 mole % based on the total moles of phenyl groups, and the weight percent of dicyanamide present in the copolymer is equal to or less than about 2 weight percent based on the total weight of the copolymer. In the most preferred embodiments of the invention, the mole % of phenyl groups substituted with carbamate functions is equal to or less than about 2 mole % based on the total moles of phenyl groups, and the amount of dicyanamide present in the copolymer is less than about 1 weight percent based on the total weight of the copolymer; with those embodiments of the invention in which substantially no phenyl groups are substituted with carbamate functions and in which substantially no dicyanamide is contained in the copolymer being the embodiments of choice.

The phenolic cyanate resin used as the precursor in the preparation of the phenolic triazine/phenolic cyanate copolymer of this invention is prepared by a nucleophilic displacement reaction through use of the process of this invention. In this reaction, a cyanogen halide, preferably cyanogen chloride or cyanogen bromide, is reacted with a base phenolic salt of Formula V:

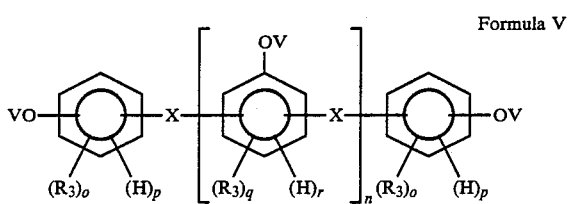

Formula V wherein $R_3$, —x—, o, p, q, r and n are as defined above, and V is hydrogen or cation of an organic or inorganic base which is formed by reaction between said base and the protons of a phenolic to form the corresponding basic salt, wherein the mole ratio of cations to hydrogen are sufficient to form the desired mole % of —OCN groups in the desired phenolic cyanate. The reaction is preferably under nitrogen in the presence of an aprotic solvent in which the salt and cyanogen halide are soluble in the substantial absence of materials having active hydrogens.

We have discovered that the reaction temperature has a significant impact on the mole percent of carbamate formed during the formation of the phenolic cyanate. Reaction temperatures can vary widely provided that they are less than about 0° C. It is believed that use of higher temperatures will result in the formation of phenolic cyanates having an unacceptable level of carbamate substituents. Preferred reaction temperatures are equal to or less than about −5° C. and more preferably are equal to or less than about −10° C. In the most preferred embodiments of the invention, reaction temperatures are equal to or less than about −15° C.

It is also preferred that isolation and purification procedures preferably avoid the use of temperatures in excess of about 0° C. In the more preferred embodiments of the invention, temperatures in excess of about −5° C. are avoided in the isolation and purification of the product, and in the most preferred embodiments temperatures in excess of about −10° C. are avoided. Surprisingly, we have also discovered that the use of temperatures in excess of those specified above during the reaction, and processing and isolation step results in the presence of an unacceptably large amount of carbamate functions.

Useful aprotic solvents can vary widely, the only requirements being that the solvent is inert under the reaction conditions and that the reactants are soluble in the solvent. In this respect, the process of this invention differs significantly from the processes of Japan Kokai Nos. 59-149918 and 58-34822 in which the process is carried out in solvents such as methylene chloride in which relatively high molecular weight novolac salt is insoluble.

Illustration of aprotic solvents useful in the conduct of this reaction are amides such as N,N-dimethyl acetamide, N,N-dimethyl formamide, and N-methyl-2 pyrrolidone; ketones such as methyl ethyl ketone, ethyl propyl ketone and the like; organic carbonates such as propyl carbonate; ethers such as diglyme, tetrahydropyran, 3-methyltetrahydrofuran, tetrahydrofuran, and glyme; organic sulfur containing compounds such as dimethyl sulfoxide, sulfones and sulphonates; and chlorinated hydrocarbons such as methylene chloride, carbon tetrachloride, chloroform and the like. The preferred solvents are ethers, and, particularly preferred solvents are cyclic ethers such as tetrahydrofuran and diethers such as glyme or diglyme.

Reaction times can vary considerably and will depend upon such factors as the degree of agitation, temperature, nature and proportion of reactants and the like. Preferred reaction times are from about 4 hours to about 6 hours. The reaction product can be recovered by conventional means with substantially anhydrous conditions. Usually, the salt by-product is separated from the dissolved product by filtration. If solid when neat, the product can be precipitated from solution using standard crystallization techniques, and purified by recrystallization from one of the above-referenced aprotic solvents. If liquid when neat, the product can be conveniently isolated and purified by conventional distillation techniques.

The base salt of phenolic prepolymer can be conveniently prepared by reaction between a base and a phenolic prepolymer. As noted above, bases for use in the preparation of the base salt may vary widely and may include both inorganic and organic bases. Illustrative of suitable bases are tertiary amines, alkali metal hydroxides, alkali metal carbonates and the like.

Preferred for use in the product of this invention are alkali metal hydroxides such as sodium hydroxide and potassium hydroxide, and tertiary amines such as triethyl amine, trimethyl amine and pyridine.

For example, alkali metal phenolic salts can be obtained by reacting 2 equivalents of sodium hydroxide with 2 or more equivalents of a phenolic resin such as phenol formaldehyde resin, substituted phenol formaldehyde resin, cashew nut shell phenol formaldehyde resin, phenol furfuraldehyde resin, and p-xylene phenolic resin, in dimethylsulfoxide solvent. Alternatively, alkali metal phenolic salts can be prepared by reacting phenolic resins and anhydrous potassium carbonate in dimethylsulfoxide under nitrogen.

The phenolic cyanate/phenolic triazine copolymer of this invention, completely cured, incompletely cured and partially-cured compositions of this invention are useful in forming a wide variety of industrial products, including shaped articles, as produced by known shaping processes. The phenolic cyanate/phenolic triazine copolymer of this invention compositions can be formed (i.e., shaped) into articles which can then be cured to form completely cured, incompletely cured and partially-cured articles. Shaped articles produced from the polymer composition include windscreens such as wind shields, structural parts, canopies, door windows, wire housing and the like. The shaping process can be any process known to one skilled in the art, such as injection, blow or extrusion molding. Another use of the crosslinked polymer of the member is a bind agent in the manufacture of friction materials such as brake linings, clutch facings and transmission bands, as for example those described in U.S. Pat. Nos. 3,966,670; 4,268,657; or 4,281,361. Still other uses of the copolymers of this invention are molding materials, composites for use in the manufacture of structural parts and the like. Yet other copolymers of this invention are useful as adhesives.

In order that those skilled in the art will be better able to practice the invention, the following examples are given by way of illustration and not by way of limitation. In the examples, all parts are by weight.

EXAMPLE 1

A. Preparation of the Phenolic Cyanate

A mixture of 1.81 kg of novolac (613 number average molecular weight), and 1.79 kg triethylamine was dissolved in 7 L of tetrahydrofuran at ambient temperature. Cyanogen bromide (2.04 kg) was dissolved in 6 L of tetrahydrofuran under nitrogen atmosphere. The solution containing the trialkylammonium salt of novolac was added to cyanogen bromide solution oveer a period of 3–4 hrs. During the addition, the temperature of the reaction mixture was maintained at $-20°$ C. to $-15°$ C. After the reaction was completed, the reaction was allowed to continue for an additional 16–18 hrs. at room temperature. The product was isolated by filtration to remove trialkylamine salt. The filtrate was purified by precipitation in 26 L of cold isopropanol/dry ice mixture ($-15°$ C. to $-20°$ C.) (twice), and subsequently dried in a vacuum oven overnight to produce off-white phenolic-cyanate. The elemental analysis indicated % C=72.25, % H=3.42, and % N=10.22. The IR spectrum indicated strong absorption at —C≡N(2250 cm$^{-1}$) and the absence of any carbamate and dicyanamide functions.

B. Preparation of the Phenolic Triazine/Phenolic Cyanate Copolymer

A 50 g sample of phenolic-cyanate of Step A was heated in a test tube for about 20 min. at 100° C. to form a yellowish white meltable phenolic cyanate-phenolic triazine copolymer. The IR spectrum indicated the presence of cyanate functions (2250 cm$^{-1}$) and triazine functions (1580 cm$^{-1}$ and 1380 cm$^{-1}$). The copolymer was soluble in tetrahydrofuran, methylene chloride, acetone, and methyl ethyl ketone. The Elemental analysis was, % C 72.25, % H 3.42, % N 10.22. The IR spectrum indicated about 15 to about 20 mole % triazine based on the total moles of phenyl groups in the copolymer.

EXAMPLE 2

A. Formation of the Phenolic-Cyanate

A mixture of 50 g of novolac (570 number average molecular weight) and 51.0 g of triethylamine was dissolved in 160 g of tetrahydrofuran at ambient temperature. A 57.7 g sample of cyanogen bromide was dissolved in 135 g of tetrahydrofuran under nitrogen atmosphere. The solution of the trialkylammonium salt of the novolac was added to the cyanogen bromide solution over a period of 1 hr. During the addition of the solution, the temperature of the reaction mixture was maintained at about $-10°$ to $-15°$ C. After the addition was completed, the reaction was allowed to continue for an additional 1 hour period at room temperature. The product was isolated from the trialkyl ammonium bromide salt by-product by filtration. The product was purified by precipitation in isopropanol/dry ice mixture ($-15°$ C. to $-20°$ C.) and subsequently dried in a vacuum oven overnight to produce off-white phenolic-cyanate.

The structure of the product was confirmed by IR spectrum which showed the presence of cyanate functions (—C≡N, 2200–2300) and the absence of carbamate functions (—NH— and =NH 3330 cm$^{-1}$).

B. Preparation of the Phenolic Cyanate/Phenolic Triazine Copolymer

A 10 g sample of phenolic-cyanate of Step A was heated in a test tube about 30 min. at 100° C. to form a yellowish polymer. The IR spectrum indicated the presence of 60 to 65 mole % cyanate (2250 cm$^{-1}$), 15 to 20 mole % triazine (1580 cm$^{-1}$, and 1380 cm$^{-1}$) and about 10 mole % phenolic hydroxyl (3400 cm$^{-1}$).

The elemental analysis was % C=72.0, % H=4.61, and % N=9.55. The copolymer was soluble in organic solvents like tetrahydrofuran, methylene chloride and methyl ethyl ketone.

EXAMPLE 3

A. Preparation of the Phenolic Cyanate

A mixture of 75.8 g of cyanogen bromide was dissolved in 75 g tetrahydrofuran. A 61.2 g sample of high ortho content novolac of number average molecular weight 620 was dissolved in 100 g of tetrahydrofuran and 66.7 g of triethylamine was added gradually to form trialkylammonium salt of novolac. The trialkylammonium salt of novolac solution was added to the cyanogen bromide solution gradually during the time of addition the temperature of the reaction mixture was maintained at about $-20°$ to $-10°$ C. After the addition was completed, the reaction was allowed to continue for 18 hrs. at room temperature. The product was isolated from trialkylammonium bromide salt by-product by filtration.

The isolated solution was added gradually to isopropanol/dry ice mixture ($-15°$ C. to $-20°$ C.). A white precipitate was formed. The product was redissolved in tetrahydrofuran and reprecipitate in isopropanol. The IR spectrum was consistent with the proposed structure and showed the absence of carbamate functions.

EXAMPLE 4

A. Preparation of the Phenolic Cyanate

A sample of 315 g of cyanogen bromide was dissolved in 500 g of tetrahydrofuran. A 288 g sample of novolac (320 number average molecular weight) was dissolved in 700 g of tetrahydrofuran, and 286 g of triethylamine was added gradually to form the trialkyammonium salt of the novolac. The solution of the trialkylammonium salt of novolac was added to the cyanogen bromide solution gradually. During the addition, the temperature of the reaction mixture was maintained at about $-20°$ to $-15°$ C. After the addition was completed, the reaction was allowed to continue for 20 hrs. at room temperature. The product was isolated from trialkylammonium bromide salt by-product by filtration.

The isolated solution was added gradually to isopropanol, forming a white gum. The gum was redissolved in tetrahydrofuran and reprecipitate in isopropanol. The resulting gum was redissolved in tetrahydrofuran, and the tetrahydrofuran solution was concentrated with a rotary evaporator. A light yellow viscous liquid formed. The IR spectrum was consistent with the proposed structure and showed the absence of carbamate functions.

B. Preparation of the Phenolic Triazine/Phenolic Cyanate Copolymer

Copolymer

A 100 g sample of viscous liquid phenolic-cyanate of Step A was heated 1½ hrs. under nitrogen to form a solid product. The IR spectrum indicated the formation of about 20 mole % linear triazine ring. The product was soluble in acetone, methyl ethyl ketone and $CH_2Cl_2$.

EXAMPLE 5

Preparation of the Phenolic Cyanate/Phenolic Triazine Copolymer

A 5 g sample of the phenolic cyanate from Step A of Example 1 was heated 5 min. at 125° C. to form phenolic cyanate-triazine copolymer. IR spectrum indicate about 10 mole % triazine formation. The copolymer is soluble in organic solvents.

EXAMPLE 6

Preparation of the Phenolic Cyanate

A mixture of 6.5 g of novolac (570 number average molecular weight) and 3.3 g of triethylamine was dissolved in 30 ml of diglyme at ambient temperature. A 3.5 g sample of cyanogen bromide solution was dissolved in 20 ml of diglyme under nitrogen atmosphere. The solution containing the trialkylammonium salt of novolac was added to cyanogen bromide over a period of 20 minutes. During the solution addition, the temperature of the reaction mixture was maintained at about −10° C. After the addition was completed, the reaction was allowed to continue for an additional 1 hour period at room temperature. The product was isolated from trialkylammonium salt by filtration and the resulting filtrate was purified by precipitation in isopropanol/dry ice mixture at −5° C. and subsequently vacuum dried to obtain a white product. The structure of product was confirmed by IR spectrum.

EXAMPLE 7

Formation of the Phenolic-Cyanate

A mixture of 50 g of novolac (570 number average molecular weight) and 51.0 g of triethylamine was dissolved in 160 g of tetrahydrofuran at ambient temperature. A 57.7 g sample of cyanogen bromide was dissolved in 135 g of tetrahydrofuran under nitrogen atmosphere. The solution of the trialkylammonium salt of the novolac was added to the cyanogen bromide solution over a period of 1 hr. During the addition of the solution, the temperature of the reaction mixture was maintained at about −10° to −15° C. After the addition was completed, the reaction was allowed to continue for an additional 1 hour period at room temperature. The product was isolated from the trialkyl ammonium bromide salt by-product by filtration. The product was purified by precipitation in isopropanol at room temperature and a white gum formed. The white gum was difficult to solidify. Analysis by GC indicated about 2-5% carbamate, and about 1-2% dicyanamide.

EXAMPLE 8

A. Formation of the Phenolic-Cyanate

A mixture of 50 g of novolac (570 number average molecular weight) and 51.0 g of triethylamine was dissolved in 160 g of tetrahydrofuran at ambient temperature. A 57.7 g sample of cyanogen bromide was dissolved in 135 g of tetrahydrofuran under nitrogen atmosphere. The solution of the trialkylammonium salt of the novolac was added to the cyanogen bromide solution over a period of 1 hr. During the addition of the solution, the temperature of the reaction mixture was maintained at about 20° C. After the addition was completed, the reaction was allowed to continue for an additional 1 hour period at room temperature. The product was isolated from the trialkyl ammonium bromide salt by-product by filtration. The product was purified by precipitation in isopropanol/dry ice mixture (−15° C. to −20° C.) and subsequently dried in a vacuum oven overnight to produce off-white phenolic-cyanate.

The structure of the product was confirmed by IR spectrum which showed the presence of cyanate functions (—C≡N, 2200-2300). The presence of about 2 to 3% dicyanamide was determined by GC.

EXAMPLE 9

A. Preparation of the Phenolic Cyanate

A mixture of 1.81 kg of novolac (613 number average molecular weight), and 1.91 kg triethylamine was dissolved in 7 L of tetrahydrofuran at ambient temperature. Cyanogen bromide (2.16 kg) was dissolved in 6 L of tetrahydrofuran under nitrogen atmosphere. The solution containing the trialkylammonium salt of novolac was added to cyanogen bromide solution over a period of 3-4 hrs. During the addition, the temperature of the reaction mixture was maintained at −20° C. to −15° C. After the reaction was completed, the reaction was allowed to continue for an additional 16-18 hrs. at room temperature. The product was isolated by filtration to remove trialkylamine salt. The filtrate was purified by precipitation in 26 L of isopropanol/dry ice mixture (−20° C.) (twice), and subsequently dried in a vacuum oven overnight to produce off-white phenolic-cyanate. The elemental analysis indicated % C=72.25, % H=3.42, and % N=10.22. The IR spectrum indicated strong absorption at —C≡N(2250 cm$^{-1}$) and the absence of any carbamate functions, and dicyanamide.

B. Preparation of the Phenolic Triazine/Phenolic Cyanate Copolymer

A 50 g sample of phenolic-cyanate of Step A was heated in a test tube for about 20 min. at 100° C. to form a yellowish white meltable phenolic cyanate-phenolic triazine copolymer. The IR spectrum indicated the presence of cyanate functions (2250 cm$^{-1}$) and triazine functions (1580 cm$^{-1}$ and 1380 cm$^{-1}$). The copolymer was soluble in tetrahydrofuran, methylene chloride, acetone, and methyl ethyl ketone. The Elemental analysis was, % C 72-25, % H 3,42, % N 10.22. The IR spectrum indicated about 15 to about 20 mole % triazine based on the total moles of phenyl groups in the copolymer.

COMPARATIVE EXPERIMENT A (1) Preparation of the Phenolic Cyanate of Japanese Kokai No. 149918-1984

To a 2 Liter beaker was added 384 g of novolac (550 number average molecular weight), 330.4 g of triethylamine and 768 g of methylene chloride. A highly viscous solution of the trialkyl ammonium salt of the novolac resulted. A 417.6 g sample of cyanogen bromide was added to 976 g methylene chloride in a 4 liter beaker, and the solution was cooled to 0° C. The trialkylammonium salt solution was added to the cyanogen bromide solution over a 45 min. period using an addition funnel while maintaining the temperature of the reaction exotherm at about 0° C. with a dry ice/isopropanol bath. The heterogeneous reaction mixture was then allowed to react for an additional 30 min., after which it was poured into 300 ml of deionized water with stirring. The methylene chloride layer was isolated and washed 2 times with 300 ml of deionized water. Upon concentration in a rotory evaporator, a semisolid product was obtained which upon drying under vacuum pump provided a solid product.

The analysis of the semisolid product by gas chromatograph indicated the presence of dicyanamide by-product. IR spectrum of solid material indicated the presence of carbamate functions (about 10–15%) at 1740 cm$^{-1}$ and 3300 cm$^{-1}$.

(2) Preparation of the Phenolic Cyanate/Phenolic Triazine Copolymer From the Phenolic Cyanate.

Using the procedure of Example 1, the phenolic cyanate of step A was treated to form a phenolic cyanate/phenolic triazine copolymer.

IR spectrum indicate presence of about 15–20 mole % triazine formation. The polymer is soluble in organic solvents.

COMPARATIVE EXAMPLE B (1) Preparation of the Phenolic Cyanate of U.S. Pat. No. 4,022,755

To a 2 liter beaker was added 100 g of novolac (380 number average molecular weight) and 500 ml methylethylketone. A yellow solution was observed in 10 minutes. The solution was cooled to 0° C., and 113 g of cyanogen bromide was added. A 99.8 g sample of triethylamine was added to the novolac-cyanogen bromide solution. The rate of addition was controlled to provide a temperature of from 5°–10° C. After the triethylamine addition, a heterogeneous reaction mixture was observed. The triethylammonium bromide salt by-product was filtered from the reaction mixture, and the filtrate was concentrated on a rotary evaporator under reduced pressure. The product obtained was insoluble in organic solvents and a gel was observed. The IR spectrum indicate formation of carbamate at 1740 cm$^{-1}$ and 3300 cm$^{-1}$. The GC analysis of reaction filtrate indicate the presence of about 5–7% dicyanamide.

(2) Preparation of the Phenolic Cyanate/Phenolic Triazine Copolymer

The above gel product of Step A was heated at about 125° C. to form phenolicyanate/phenolic triazine copolymer.

This product was moldable at 160° C., 300 psi.

COMPARATIVE EXAMPLE C (1) Preparation of the Phenolic Cyanate of U.S. Pat. No. 4,022,755

To a mixture of 108 g (0.999 mole) of m-cresol and 65 g (0.801 mole as $CH_2O$) of formalin (37% $CH_2O$) were added 0.2 g of (0.0022 mole) oxalic acid and 0.1 g (0.0010 mole as HCl) of hydrochloric acid (35%). The mixture was heated at 99° C. to 100° C. to form an emulsion. The emulsion was refluxed for 4 hours and 30 minutes, and then dehydrated under reduced pressure to obtain a solid cresol novolac. The resulting cresol novolac had a melting point of 92°–103° C.

In 210 ml of acetone was dissolved 72 g (0.6 mole as —OH) of the m-cresol novolac. The resulting solution was cooled to 0° C. To the cooled solution was added 70 g (0.661 mole) of cyanogen bromide followed by dropwise addition of 64 g (0.632 mole) of triethylamine. After completion of the reaction, the triethylamine hydrobromide salt was removed. The resulting reaction mixture was added to vigorously stirred water. A semisolid product obtained which was dried 40° C. in a vacuum oven to 18 hrs. to obtain a solid powder having a melting point of 72°–78° C. IR spectrum revealed a strong absorption at 2250 cm$^{-1}$ which indicated formation of cyanate (about 80–85%). The spectrum also indicate 5 mole % carbamate formation and 10–15 mole % of unreacted hydroxyl groups.

A 50 g sample of the phenolic cyanate was molded in a 3"×3" mold at 155° C., 300 psi for 10 min. The materials squeeze out from the mold without forming representative sample for thermal (Tg) and mechanical measurements.

(2) Preparation of Phenolic Cyanate/Phenolic Cyanate Triazine Copolymer

A 20 g sample of m-cresol phenolic-cyanate (M.P 72°–78° C.) was heated 80° C. for 20 min. to form a meltable phenolic cyanate-phenolic triazine copolymer which was soluble in organic solvents. IR spectrum analysis indicated that the copolymer included about 30 mole % linear triazine formation.

The above copolymer was molded in a 3"×3" mold at 155° C., 300 psi, for 10 min. to obtained a tough plague. During the time of molding, there was very little loss of material due to flashout.

COMPARATIVE EXAMPLE D (1) Preparation of Phenolic Cyanate of U.S. Pat. No. 3,448,079

A 106 g sample of novolac (620 number average molecular weight) and which contains one OH group per 106 molecular weight was dissolved in 250 ml of acetone. The solution was cooled to 0° C. after which 128 g of cyanogenbromide was added. To the solution was then slowly added dropwise 145 ml of triethylamine. Cyanogen bromide (5 g) was then added to the reaction mixture during the course of the reaction to replace evaporation loses. The triethylaminehydrobromide salt produced by the reaction was removed by suction filtration, and the filtrate concentrated by evaporation to provide a solid powder. IR spectrum indicated cyanate formation and the presence of carbamate functions.

(2) Preparation of the Phenolic Triazine/Phenolic Cyanate Copolymer

A 50 g sample of phenolic cyanate of Step A was heated to 100° C. for 15 min. to form the phenolic triazine/phenolic cyanate copolymer having 5–10 mole % triazine. This material was molded at 155° C. for 6 min to provide a plague. The plague was postcured for about 4 hrs. before any thermal and mechanical properties measurements were obtained.

COMPARATIVE EXAMPLE E

A series of experiments were carried out for the purpose of evaluating the thermal characteristics of certain embodiments of this invention whose preparation is described in Examples 1(A), 1(B), 2(A), and 4(A) and to compare same to the thermal characteristics of the materials of Comparative Examples A(1), B(1), C(1) and D(1) and to the thermal characteristics of a base phenolic resin. The thermal characteristics were chosen for comparative purposes because these characteristics impact significantly on the use of these materials in high temperature applications. In these experiments, thermogravimentric analysis (TGA) was carried out in an argon atmosphere to determine the weight loss of a sample as a function of temperature and the % Char at 1000° C. These experiments were carried out using a Dupont-1090 thermogravimeter at a heating rate of 10° C./min. The typical size sample was 30–40 mg. The results of these experiments are set forth in the following TABLE I.

TABLE I

| Exp. No. | Sample | % Weight Loss at °C. | | | | | | | | | % Char at 1000° C. |
|---|---|---|---|---|---|---|---|---|---|---|---|
| | | 200° C. | 300° C. | 400° C. | 450° C. | 500° C. | 600° C. | 700° C. | 800° C. | 900° C. | |
| 1. | Novolac | 0 | 0 | 4 | 25 | 39 | — | 58 | — | 55 | 45 |
| 2. | Ex. 1(B) | 0 | 0 | 0 | 1.2 | 14 | 24 | 30 | 32 | 33 | 66 |
| 3. | Ex. 1(B) | 0 | 0 | 0 | 0 | 12.5 | 25 | 32 | 31 | 35 | 65.3 |
| 4. | Ex. 2(B) | 3 | 3 | 3 | 6 | 13 | 24 | 32 | 34 | 35 | 65 |
| 5. | Ex. 4(B) | 0 | 0 | 0 | 2.5 | 16 | 25 | 31 | 33 | 35 | 65 |
| 6. | Ex. A(1) | 13 | 14 | 15 | 20 | 26 | 34 | 40 | 42 | 43 | 55 |
| 7. | Ex. B(1) | 15 | 16 | 17 | 18 | 24 | 35 | 38 | 42 | 41 | 56 |
| 8. | Ex. C(1) | 15 | 15.5 | 16 | 34 | 38 | 46 | 48 | 51 | 53 | 46 |
| 9. | Ex. D(1) | 3.5 | 4.5 | 10 | 20 | 30 | 39 | 46 | 48 | 47 | 53 |
| 10. | Ex. D(2) | 2.0 | 3.5 | 8 | 17 | 21 | 35 | 44 | 46.5 | 47 | 56 |
| 11. | 9(A) | 2.4 | 3 | 3 | 15 | 20 | 29 | 35 | 38 | — | 59.64 |
| 12. | 9(B) | 0 | 0 | 0 | 1.2 | 10 | 22 | 25 | 32 | — | 62.19 |

COMPARATIVE EXAMPLE F

A series of experiments were carried out for the purpose of evaluating the glass transition (Tg) of cured compositions of this invention whose preparations are described in Examples 1(A), 1(B), 3(A) and 3(B) and to compare same to the glass transition temperature of the cured compositions formed from the compositions whose preparation are described in Comparative Examples B(1), C(1), C(2), D(1) and D(2). In these experiments, the glass transition temperature was determined on molded articles. Molding was carried out for 6 minutes at 155° C. followed by post curing for 4 hours at 22° C. The glass transition temperature was determined on a 4 cm × 1 cm plagues by dynamic mechanical analysis (DMA) where the upper limit was 300° C. The results of the test are set forth in the following Table II.

TABLE II

| Exp. No. | Sample | Tg (°C.) |
|---|---|---|
| (1) | Ex. 1(A) | >280 |
| (2) | Ex. 2(B) | >300 |
| (3) | Ex. 3(A) | >300 |
| (4) | Ex. 3(B) | >300 |
| (5) | Ex. 9(B) | >300 |
| (6)* | Ex. B(1) | 68 |
| (7) | Ex. C(1) | 250 |
| (8) | Ex. C(2) | 280 |
| (9) | Ex. D(1) | 225 |
| (10) | Ex. D(2) | 250 |

*The sample did not cure properly, and formed blisters.

COMPARATIVE EXAMPLE G

Using molded plaques formed as described in COMPARATIVE EXAMPLE F, a series of experiments were carried out for the purpose of evaluating the flexural modulus and flexural strength of cured compositions of this invention formed from the compositions of this invention whose preparation are described in Examples 1(A) and 1(B), and to compare same to the flexural strength and tensile strength of cured compositions formed from the compositions whose preparation is described in Comparative Examples C(1), C(2), D(1) and D(2). In these experiments, the flexural strength and the flexural modulus were determined using an Instrum Machine with standard test methods, ASTM D790. The results of these experiments are set forth in the following Table III.

TABLE III

| Exp. No. | Sample | Flexural Strength (psi) | Flexural Modulus (psi) |
|---|---|---|---|
| 1 | Ex. 1(B) | — | — |
| 2 | Ex. 2(B) | 9785 (687.9 kg/cm$^2$) | .69 × 10$^6$ (0.48 × 10$^5$ kg/cm$^2$) |
| 3 | Ex. 9(B) | 10,937 (768.94 kg/cm$^2$) | .61 × 10$^6$ (0.42 × 10$^5$ kg/cm$^2$) |
| 4 | Ex. 3(B) | — | — |

TABLE III-continued

| Exp. No. | Sample | Flexural Strength (psi) | Flexural Modulus (psi) |
|---|---|---|---|
| 5 | Ex. C(2) | 6275 (441.1 kg/cm²) | .67 × 10⁶ (0.47 × 10⁵ kg/cm²) |
| 6 | Ex. D(1) | — | — |
| 7 | Ex. D(2) | 8200 (576.5 kg/cm²) | .68 × 10⁶ (0.47 × 10⁵ kg/cm²) |

COMPARATIVE EXAMPLE H

A series of experiments were carried out for the purpose of evaluating the shelf life of each of the compositions of this invention whose preparations are described in Examples 1, 2 and 4 and to compare same to the shelf life of each of the compositions whose preparations are described in Comparative Examples A(1), B(1), C(1) and D(1). In these experiments, the shelf of the composition was determined by storing same at room temperature to determine the number of days necessary for the formation of materials which were insoluble in several organic solvents. The results of these studies are set forth in the following Table IV.

TABLE IV

| | | Sample | | | | | | | | | |
|---|---|---|---|---|---|---|---|---|---|---|---|
| Exp. No. | Solvent | Ex 1(A) | Ex 2(B) | Ex 2(A) | Ex 4(A) | Ex (7) | Ex (8) | A(1) | B(1) | C(1) | D(1) |
| (1) | Tetrahydrofuran | S(90) | S(90) | S(>90) | S(>90) | S(2) | S(3) | S(3) | I(0) | S(2) | S(1) |
| (2) | Methylene Chloride | S(90) | S(90) | S(>90) | S(>90) | I | I | I(0) | I(0) | I(0) | I(0) |
| (3) | Methyl Ethyl Ketone | S(90) | S(90) | S(>90) | S(>90) | S(2) | S(3) | S(3) | I(0) | I(0) | S(1) |

In the table, the following abbreviations are used:
(a) "S" is soluble and
(b) "I" is insoluble.

The number in the parenthesis is the number of days on the shelf before becoming insoluble.

What is claimed is:

1. A phenolic triazine/phenolic cyanate copolymer comprising three or more phenolic moieties of the formula:

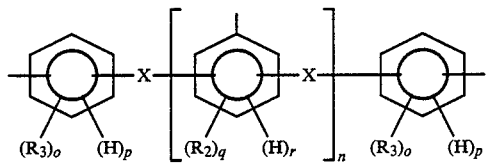

linked by way of at least one of open valencies to one or more triazine moieties of the formula:

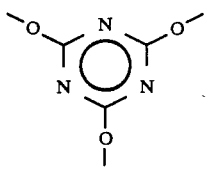

and wherein the remainder of the open valencies of said phenolic moieties are substituted with —OH, —OCN, or other triazine moieties, provided that at least one of said remaining open valencies is substituted with a —OCN moiety; wherein:

n is a positive whole number equal to or greater than 1;

q and r are the same or different at each occurrence and are whole numbers from 0 to 3 with the proviso that the sum of q and r at each occurrence is equal to 3;

o and p are the same or different at each occurrence and are whole numbers from 0 to 4, with the proviso that the sum of o and p is equal to 4;

—X— is a divalent organic radical; and

R₃ is the same or different at each occurrence and is a substituent other than hydrogen which is unreactive under conditions necessary to crosslink the cyanurate moieties wherein the completely cured product of said copolymer exhibits a weight loss equal to or less than about 16 wgt. % based on the total weight of the completely cured product on heating said product from about 20° C. to a temperature of 500° C. at a rate of 10° C./min in an argon atmosphere.

2. A copolymer according to claim 1 wherein said weight loss is equal to or greater than about 14 wgt. %.

3. A compolymer according to claim 2 wherein said weight loss is equal to or less than about 13 wgt. %.

4. A copolymer according to claim 1 wherein said completely cured product of said copolymer exhibits a weight loss equal to or less than about 6 wgt. based on the total weight of the completely cured product on heating said product from about 20° C. to a temperature of 450° C. at a rate of 10° C./min in an argon atmosphere.

5. A copolymer according to claim 4 wherein said weight loss is equal to or less than about 2.5 wgt. %.

6. A copolymer according to claim 1 wherein said completely cured product of said copolymer exhibits a % char at 1000° C. equal to or greater than about 62% based on the total weight of product on heating said product from about 20° C. to 1000° C. at a rate of 10° C./min under an argon atmosphere.

7. A copolymer according to claim 6 wherein said % char is equal to or greater than about 65%.

8. A copolymer according to claim 1 wherein up to about 30 mole % of the phenyl groups in said copolymer are substituted with triazine moieties said mole percent based on the total moles of phenyl groups in said copolymer.

9. A copolymer according to claim 8 wherein the mole % of phenyl groups substituted with triazine moieties is from about 2 to about 25 mole %.

10. A copolymer according to claim 1 wherein up to about 90 mole % of the phenyl groups in said copolymer are substituted with —OCN groups, said mole percent based on the total moles of phenyl groups in said copolymer.

11. A copolymer according to claim 10 wherein the mole % of phenyl groups substituted with —OCN groups is from about 40 to about 90 mole %.

12. A copolymer according to claim 1 wherein up to about 90 mole % of the phenyl groups of said copolymer are substituted with —OH groups, said mole % based on the total moles of phenyl groups in said copolymer.

13. A copolymer according to claim 12 wherein the mole % of phenyl groups substituted with —OH groups is from about 2 to about 50 mole %.

14. A copolymer according to claim 1 wherein the mole % of phenyl groups substituted with carbamate functions is less than about 5 mole %.

15. A copolymer according to claim 14 wherein the mole % of phenyl groups substituted with carbamate functions is less than about 2 mole %.

16. A copolymer according to claim 15 where none or substantially none of the phenyl groups are substituted with carbamate functions.

17. A copolymer according to claim 1 which comprises less than about 5 weight % dicyanamide.

18. A copolymer according to claim 17 which comprises less than about 2 weight % dicyanamide.

19. A copolymer according to claim 18 which comprises less than about 1 weight % dicyanamide.

20. A copolymer according to claim 19 which comprises no dicyanamide or substantially no dicyanamide.

21. A copolymer according to claim 1 wherein X is substituted or unsubstituted methylene or 1,4-phenyldimethylene, wherein permissible substituents are alkyl having from 1 to about 10 carbon atoms, halogen and furyl.

22. A copolymer according to claim 21 wherein X is a moiety of the formula:

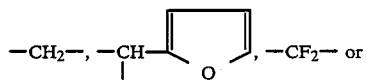

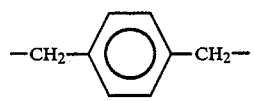

23. A copolymer according to claim 1 wherein n is from 1 to about 20.

24. A copolymer according to claim 23 wherein n is from about 1 to about 10.

25. A copolymer according to claim 1 wherein:
o is 0 or 1; and
p is 2 or 4.

26. A copolymer according to claim 1 wherein:
q is 0 or 1; and
r is 2 to 3.

27. A copolymer according to claim 1 wherein $R_3$ is alkyl.

28. A copolymer according to claim 27 wherein $R_3$ is methyl or ethyl.

29. A composition comprising a copolymer phenolic resin according to claim 1 and one or more fibrous or particulate fillers.

30. A completely cured composition formed by cyclotrimerization of the copolymer of claim 1.

31. A partially cured composition formed by cyclotrimerization of the copolymer of claim 1.

32. An incompletely cured composition formed by cyclotrimerization of the copolymer of claim 1.

33. A phenolic triazine/phenolic cyanate copolymer comprising three or more phenolic moieties of the formula:

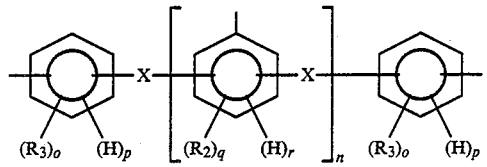

linked by way of at least one of open valencies to one or more triazine moieties of the formula:

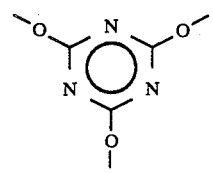

and wherein the remainder of the open valencies of said phenolic moieties are substituted with —OH, —OCN, or other triazine moieties, provided that at least one of said remaining open valencies is substituted with a —OCN moiety; wherein:

n is a positive whole number equal to or greater than 1;

q and r are the same or different at each occurrence and are whole numbers from 0 to 3 with the proviso that the sum of q and r at each occurrence is equal to 3;

o and p are the same or different at each occurrence and are whole numbers from 0 to 4, with the proviso that the sum of o and p is equal to 4;

—X— is a divalent organic radical; an $R_3$ is the same or different at each occurrence and is a substitutent other than hydrogen which is unreactive under conditions necessary to crosslink the cyanurate moieties:

wherein said copolymer forms no or substantially no solids which are insoluble in tetrahydrofuran after storage at about a temperature of 20° C. for a time period in the range of from more than about 3 days to about 90 days.

34. A copolymer according to claim 33 wherein said resin forms no or substantially no solids which are insoluble in tetrahydrofuran after storage at about 20° C. for about 90 days.

35. A copolymer according to claim 34 wherein said resin forms no or substantially no solids which are insoluble in tetrahydrofuran on storage at about 20° C. for more than about 90 days.

36. A copolymer according to claim 33 wherein up to about 30 mole % of the phenyl groups in said copolymer are substituted with triazine moieties said mole percent based on the total moles of phenyl groups in said copolymer.

37. A copolymer according to claim 36 wherein the mole % of phenyl groups substituted with triazine moieties is from about 2 to about 25 mole %.

38. A copolymer according to claim 33 wherein up to about 90 mole % of the phenyl groups in said copolymer are substituted with —OCN groups, said mole percent based on the total moles of phenyl groups in said copolymer.

39. A copolymer according to claim 38 wherein the mole % of phenyl groups substituted with —OCN groups is from about 40 to about 90 mole %.

40. A copolymer according to claim 33 wherein up to about 90 mole % of the phenyl groups of said copolymer are substituted with —OH groups, said mole based on the total moles of phenyl groups in said copolymer.

41. A copolymer according to claim 40 wherein the mole % of phenyl groups substituted with —OH groups is from about 2 to about 50 mole %.

42. A copolymer according to claim 33 wherein the mole % of phenyl groups substituted with carbamate functions is less than about 5 mole %.

43. A copolymer according to claim 42 wherein the mole % of phenyl groups substituted with carbamate functions is less than about 2 mole %.

44. A copolymer according to claim 43 where none or substantially none of the phenyl groups are substituted with carbamate functions.

45. A copolymer according to claim 33 which comprises less than about 5 weight % dicyanamide based on the total weight of the copolymer.

46. A copolymer according to claim 45 which comprises less than about 2 weight % dicyanamide.

47. A copolymer according to claim 46 which comprises less than about 1 weight % dicyanamide.

48. A copolymer according to claim 47 which comprises no dicyanamide or substantially no dicyanamide.

49. A copolymer according to claim 33 wherein X is substituted or unsubstituted methylene or 1,4-phenyldimethylene, wherein permissible substitutents are alkyl having from 1 to about 10 carbon atoms, halogen and furyl.

50. A copolymer according to claim 49 wherein X is a moiety of the formula:

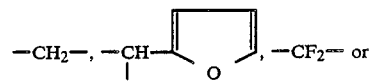

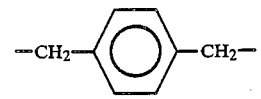

51. A copolymer according to claim 33 wherein n is from 1 to about 20.

52. A copolymer according to claim 51 wherein n is from about 1 to about 10.

53. A copolymer according to claim 33 wherein:
o is 0 or 1; and
p is 2 or 4.

54. A copolymer according to claim 33 wherein:
q is 0 or 1; and
r is 2 to 3.

55. A copolymer according to claim 33 wherein $R_3$ is alkyl.

56. A copolymer according to claim 55 wherein $R_3$ is methyl or ethyl.

57. A composition comprising a copolymer phenolic resin according to claim 87 and one or more fillers.

58. A completely cured composition formed by cyclotrimerization of the copolymer of claim 33.

59. A partially cured composition formed by cyclotrimerization of the copolymer of claim 33.

60. An incompletely cured composition formed by cyclotrimerization of the copolymer of claim 33.

* * * * *

UNITED STATES PATENT AND TRADEMARK OFFICE
CERTIFICATE OF CORRECTION

PATENT NO. : 4,970,276
DATED : Nov. 13, 1990
INVENTOR(S) : Sajal Das and Dusan Prevorsek It is certified that error appears in the above-identified patent and that said Letters Patent is hereby corrected as shown below:

Col. 24, line 31:   "claim 87" should read -- claim 33 --.

Signed and Sealed this

Twenty-sixth Day of January, 1993

*Attest:*

STEPHEN G. KUNIN

*Attesting Officer*                *Acting Commissioner of Patents and Trademarks*